(No Model.) 2 Sheets—Sheet 1.
J. B. EVANS.
BICYCLE.
No. 449,581. Patented Mar. 31, 1891.
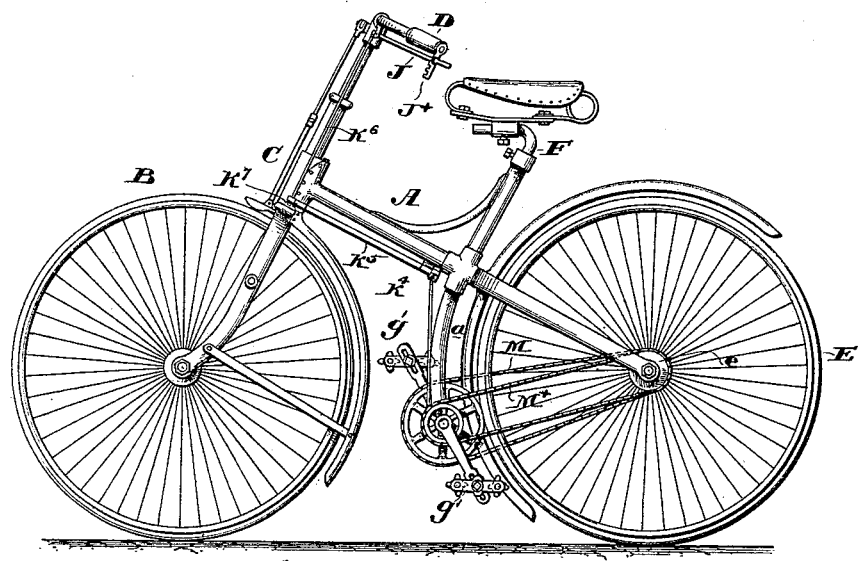
Fig. 1.
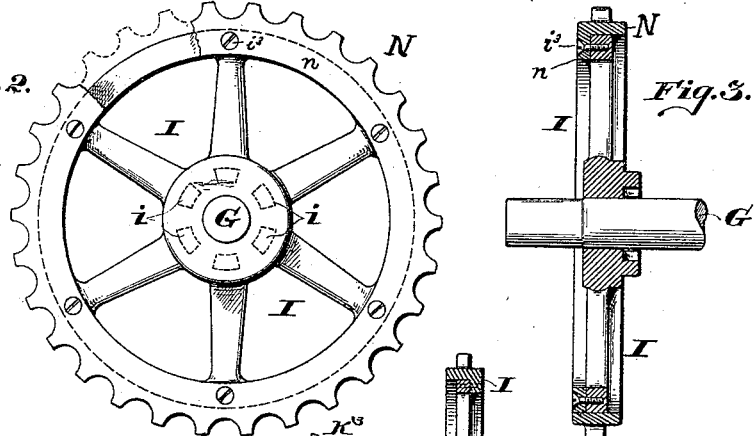
Fig. 2. 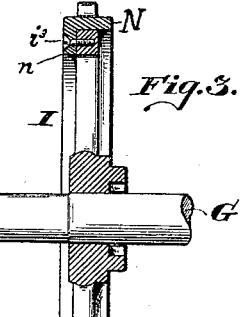 Fig. 3.
Fig. 4.
WITNESSES:
F. Norman Dixon,
Lewis Altmaier,
INVENTOR:
John B. Evans
By his Attorneys
Wm C. Strawbridge
J Bonsall Taylor (No Model.) 2 Sheets—Sheet 2.
J. B. EVANS.
BICYCLE.
No. 449,581. Patented Mar. 31, 1891.
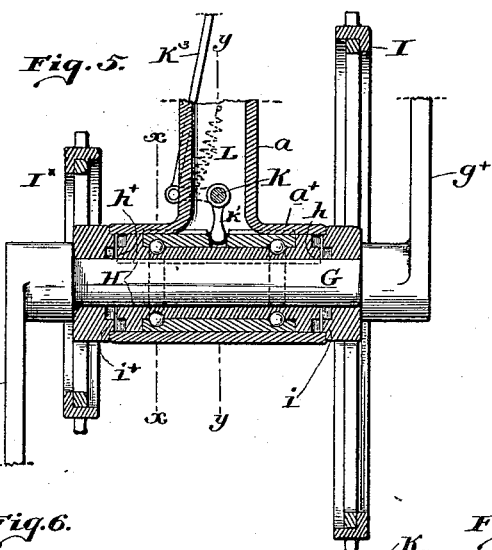
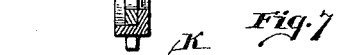
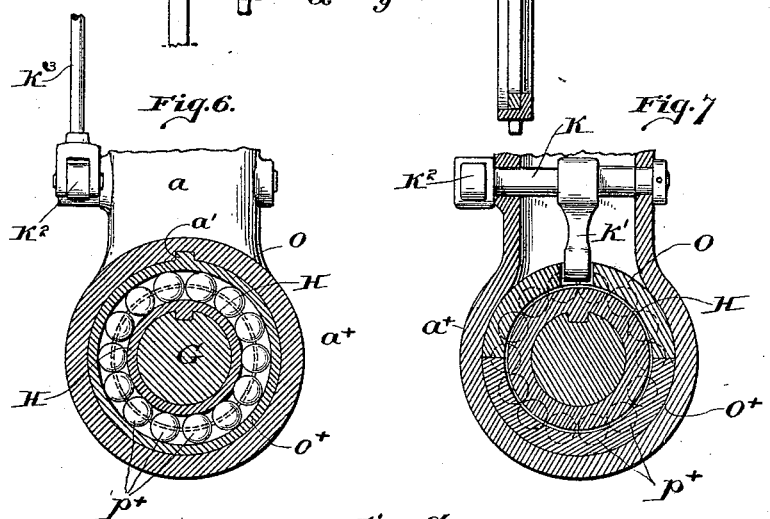
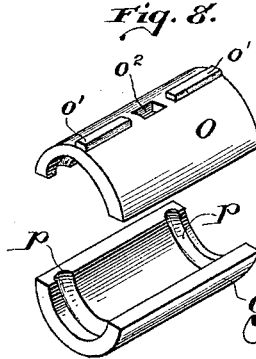
WITNESSES:
F. Norman Dixon
Lewis Attmaier
INVENTOR:
John B Evans
By his attorneys
Wm C Strawbridge
J Bousall Taylor
THE NORRIS PETERS CO., PHOTO-LITHO., WASHINGTON, D. C.

UNITED STATES PATENT OFFICE.

JOHN B. EVANS, OF PHILADELPHIA, PENNSYLVANIA, ASSIGNOR OF ONE-HALF TO HENRY SCHWARTZ, OF SAME PLACE.

BICYCLE.

SPECIFICATION forming part of Letters Patent No. 449,581, dated March 31, 1891.

Application filed July 8, 1890. Serial No. 358,095. (No model.)

*To all whom it may concern:*

Be it known that I, JOHN B. EVANS, a citizen of the United States, residing in the city and county of Philadelphia, in the State of Pennsylvania, have invented certain new and useful Improvements in Bicycles, of which the following is a specification.

My invention is of especial applicability to the class of bicycles which are known as "Safeties" and in which the propulsion of pedals is transmitted to the rear wheel as a driver through the intervention of sprocket chains. Under modifications which would be apparent to a bicycle builder the invention is also applicable to other types of machines.

The object of my invention is to provide a bicycle the crank axle of which supports two sprocket wheels and a clutch—with a simple and compact bearing for said crank axle and clutch. To this end my invention comprehends the devices hereinafter set forth and claimed.

In the drawings I have represented a Safety bicycle of a well known type embodying my improvements.

In the drawings, Figure 1 is a side elevational view of the entire machine. Fig. 2 is a side elevational view of one of the crank axle sprocket wheels constructed in accordance with my invention. Fig. 3 is a transverse vertical central sectional elevation of the same. Fig. 4 is a longitudinal vertical sectional elevation through the crank axle bearing, my improved speed and power clutch, and the sprocket wheels which operate in connection therewith, the view also representing in elevation the crank axle and portions of the pedal cranks which drive it. Fig. 5 is a longitudinal vertical sectional elevation through the crank axle bearing, and the improved speed and power clutch, illustrating the application in connection with the clutch of a bushing and of ball bearings,—the view also representing in elevation the crank axle and portions of the pedal cranks which drive it. Fig. 6 is a transverse sectional elevation taken on the line $xx$ of Fig. 5. Fig. 7 is a transverse sectional elevation taken on the line $yy$ of Fig. 5, and Fig. 8 is a view in perspective of the bushing removed from the clutch.

Similar letters of reference indicate corresponding parts.

In the drawings, A represents the main frame of the machine, which may be of any preferred construction usual in bicycles. B is the front or pilot wheel; C the front fork and fork standard of said wheel; D the steering handle; E the rear or driving wheel, and F the saddle support upon the main frame. All of the foregoing parts are those usual in machines of the class represented.

$a$ is a depending bracket or hanger, the lower extremity of which is formed into or provided with a boxing or journal bearing $a^x$ for the crank axle G, which latter finds its bearing within the tubular interior of said boxing through the intervention of a cylindriform sliding clutch sleeve H, accurately fitted upon the crank axle and feathered with respect thereto by means of the spline or feather $g$, which, while permitting the longitudinal sliding of said sleeve upon said axle, compels its rotation with the axle whatever may be its position of longitudinal adjustment thereon.

$g^x$ are the pedal cranks respectively keyed to the respective extremities of the crank axle G. The rotary movement of these pedal cranks under the throw of the pedals $g'$ compels the rotation of the crank axle.

I is what I term a major driving sprocket wheel, and $I^x$ what I term a minor driving sprocket wheel. These wheels are, as shown in Fig. 4, respectively applied to the respective extremital portions of the crank axle exterior to the boxing for said axle, and to the inside of the hubs of the respective pedal cranks. Each of these sprocket wheels is preferably, although not necessarily, a chain wheel of a construction invented by me and represented particularly in Figs. 2 and 3, and each is as to its hub accurately fitted to and free for rotation upon the crank axle. The inside face of the hub of each of these wheels is provided with a ratchet or clutch face, which faces are respectively designated $i$ $i^x$, and are respectively arranged to be alternately but never consonantly engaged with ratchet or clutch faces $h$ $h^x$ respectively formed upon the respective end faces of the clutch sleeve H.

It is obvious that when the clutch sleeve is in the central position, or that represented in Figs. 4 and 5, its clutch faces are disengaged from both of the corresponding clutch faces of the driving sprocket wheels, while when said clutch sleeve is moved toward the major driving sprocket wheel its face engages with the clutch face upon said wheel and engagement is effected between said wheel and the crank axle, the whole becoming for the time being a part of said axle, and rotating fixedly therewith. The reverse movement of the clutch sleeve occasions a similar engagement of the minor driving sprocket wheel with the crank axle, setting free the major sprocket wheel.

Many devices for occasioning the longitudinal movement of the clutch sleeve may obviously be resorted to. I find it convenient to employ a system of bell cranks and link connections through which the movements of a hand lever J applied to the steering handle D are transmitted to the sleeve, and by said sleeve received through the medium of any suitable device and such for example as the grooved collar $h^2$ shown in Fig. 4 as formed upon its exterior.

K is the shaft of a bell crank lever, journaled transversely to the crank axle, within the depending hanger $a$, and conveniently extending as to one extremity out through and projecting beyond said hanger. One member $k'$ of the bell crank is mounted upon the shaft K within the hanger, and is shown in Fig. 4 as engaged in the grooved collar $h^2$, while the other member, $k^2$, of said bell crank, is mounted upon the outwardly projecting extremity of said shaft, and is engaged with the lower end of a depending link or rod $k^3$, the upper end of which latter is secured to one member of a bell crank lever $k^4$ mounted upon the main frame of the machine. By means of the links $k^5$ and $k^6$, and the bell crank $k^7$, the train or connection from the clutch to the hand lever J is completed.

$J^\times$ is a rack depending from the handle D and containing three recesses designed to receive and hold the lever J, each being adapted to hold it in one of the three respective adjustments of which said lever is capable in placing the clutch in its respective positions of engagement with the major sprocket wheel, of disengagement from both wheels, or of engagement with the minor sprocket wheel.

I prefer to so arrange the clutch or the mechanism controlling it, that the clutch face $h^\times$ shall normally be in engagement with the clutch face $i^\times$ of the minor sprocket wheel $I^\times$, and this may of course be accomplished in various ways. A convenient method of effecting this end is that shown particularly in Figs. 4 and 5 of the drawings, in which a contractile spring L of the spiral variety is engaged with the member $k^2$ of the bell crank lever K, and, extending upward, is secured to the hanger $a$ at a point above the casing $a^\times$, so that the stress of said spring through the bell crank constantly tends to throw the clutch into engagement with the minor sprocket wheel.

As stated, the foregoing is simply one of many types of clutch operating connective devices between the hand lever J and the clutch sleeve itself to which resort might be had.

M $M^\times$ are sprocket chains between the respective driving wheels and a pair of counterpart driven sprocket wheels $e$ keyed upon the axle of the driving wheel E.

It will now be apparent that when the major driving sprocket wheel is engaged by the clutch, the bicycle is geared for speed, while when the minor driving sprocket wheel is engaged with the clutch, the machine is geared for power. In either of the foregoing engagements both of the driving sprocket wheels, as well of course as the driven, are running with their chains, but one only is driving, the other being temporarily, as is obvious, but an idle wheel.

The construction of driving sprocket wheels to which I as stated resort, and which is shown in Figs. 2 and 3, is one in which the wheels are equipped with removable sprocket provided rims or fellies N,—attachment of said rims to the wheels being conveniently effected by screws $i^3$ passing through inwardly extending flanges $n$ with which said rims are provided, and entered in the wheels themselves.

It is obvious that by providing rims of different radial dimensions or thicknesses, the sizes of these sprocket wheels may be varied, so as to without removing the bodies of the wheels provide for different speeds. This construction is of peculiar value in my invention because of the increased cost of the driving sprocket wheels by reason of the clutch faces on their hubs.

It is obvious that in the practical employment of my invention, it is possible for the rider to by setting the clutch in its intermediate position, in which it is withdrawn from engagement with both sprocket wheels, hold his feet upon the pedals and maintain said pedals relatively stationary while the machine is coasting,—for the reason that in such position both sprocket wheels will rotate idly upon the crank axle. It is further obvious that the arrangement shown and described, in which the clutch in its intermediate position is out of engagement with both clutch faces of the sprocket wheels, is a feature of value inasmuch as the rider of the machine, in changing the gear, may avoid the possibility of breakage which might be incident to abruptly shifting the clutch when at one speed into engagement with a wheel revolving at another speed,—by withdrawing said clutch into said intermediate position, suitably modifying, through the instrumentality of the pedals, the speed of rotation of the axle to suit the speed of the sprocket wheel with which engagement is to be made, and then effecting said engagement by the means supplied for the purpose.

In Fig. 4 of the drawings I show the clutch sleeve which revolves with the axle, as resting and finding its bearing against the inner face of the casing $a^x$.

In Figs. 5, 6, and 7, I show as interposed between the clutch sleeve and the casing $a^x$ a bushing and also a ball bearing for the revolving clutch sleeve. In this construction a suitable space is left between the exterior of the clutch sleeve and the interior of the casing for the introduction of said bushing, which is conveniently made in two parts, or halves, one part of which I designate O, and the other $O^x$, which parts together surround the sleeve and fill the space referred to. The upper inner face of the casing $a^x$ in this construction, embodies a recess $a'$ in which is engaged a feather $o'$ formed upon the part O of said bushing, so that said bushing is held against rotation, but is free for longitudinal movement with the clutch sleeve. The inner face of the bushing embodies a pair of circumscribing grooves $p$, and the exterior face of the clutch sleeve embodies a corresponding pair of grooves, which pairs of grooves, when the bushing and clutch are brought together, register with each other and are adapted to contain the balls $p^x$ to form a ball bearing. In this construction the part O of the bushing conveniently embodies, to engage the bell crank member $k'$, an aperture or recess $o^2$ in its upper face in lieu of the grooved collar of the construction of Fig. 4. By this means are obtained for the improved construction of bicycle hereinbefore detailed, the well known advantages incident to the employment of ball bearings as well as the advantages incident to the employment of a removable bushing, which latter may of course be employed independently of the balls. It is obvious that upon the wearing out of the clutch sleeve or of the bushing either or both may be replaced at trifling expense.

It is of course apparent that very many of the details of the construction hereinbefore described may be varied at will, without departure from my invention, as it is obvious that no part of the invention resides in the precise form or arrangement of clutch, sleeve, bearings, or bushings, but that in the construction of the device, all such matters are subject to the modifications which the practical sklll of the workman, or considerations of economy, may suggest.

Having thus described my invention, I claim:

1. In combination with a bicycle having a driving wheel, a crank axle, driving pedals mounted on said axle, two sprocket wheels loosely mounted on said axle, a clutch adapted to make engagement with either of said sprocket wheels, but so influenced by a spring as to be normally in engagement with the smaller of said wheels, substantially as set forth.

2. In combination with a bicycle having a driving wheel, a crank axle, driving pedals mounted on said axle, two sprocket wheels mounted upon said axle, a clutch mounted upon said axle and adapted to be set in engagement with either of said sprocket wheels, said axle and clutch being together mounted in a boxing, and means for shifting said clutch, substantially as set forth.

3. In combination with a bicycle having a driving wheel, a crank axle, driving pedals mounted upon said axle, two sprocket wheels mounted upon said axle, a clutch mounted upon and keyed to said axle and adapted for engagement with either of said sprocket wheels, an inclosing boxing in which said axle and clutch are mounted, within which they are provided with ball bearings, and means for occasioning the throw of the clutch, substantially as set forth.

4. In combination with a bicycle having a driving-wheel, a crank axle, driving pedals mounted upon said axle, two sprocket wheels mounted upon said axle, a clutch keyed upon and seated to said axle and adapted for engagement with either of said sprocket wheels, an inclosing boxing in which said axle and clutch are mounted for rotation, a bushing situated within the boxing and circumscribing the clutch, balls constituting a ball bearing existing between the said clutch and said bushing, and means for occasioning the throw of said clutch, substantially as set forth.

5. In combination with a bicycle having a driving wheel, a crank axle, driving pedals mounted upon said axle, two sprocket wheels mounted upon said axle, a clutch seated upon and keyed to said axle in such manner as to be free for limited longitudinal movement with reference to it, and adapted for engagement with either of said sprocket wheels, an inclosing boxing in which said axle and clutch are mounted for rotation, a bushing situated within the boxing and circumscribing the clutch, held by being keyed to the boxing from rotation with the clutch but held to the clutch in such manner as to move longitudinally with it, recesses in the exterior of the clutch, corresponding recesses in the interior of the bushing, balls situated within said recesses, and means for occasioning the throw of the clutch and bushing, substantially as set forth.

6. In combination with a bicycle having a driving wheel, a crank axle, driving pedals mounted upon said axle, a clutch seated upon and keyed to said axle in such manner as to be free for limited longitudinal movement with reference to it, and adapted for engagement with either of said sprocket wheels,— an inclosing boxing in which said axle and clutch are mounted for rotation, a two part bushing situated within the boxing, and circumscribing the clutch, held by being keyed to the boxing from rotation with the clutch, but held to the clutch in such manner as to move longitudinally with it, balls between said clutch and said bushing, and a bell crank lever, one member of which is engaged in a recess in the bushing, substantially as set forth.

7. As an article of manufacture, a composite wheel for a Safety bicycle of the character described, consisting of a body the hub of which embodies a clutch face, and a removable sprocket equipped rim of any desired thickness having a flange fitting and adapted to be secured to the body of said wheel, substantially as set forth.

In testimony that I claim the foregoing as my invention, I hereunto sign my name this 3d day of June, A. D. 1890.

JOHN B. EVANS.

In presence of—
  JAMES S. PHILLIPS,
  F. NORMAN DIXON.